United States Patent [19]

Chatenay épouse Compagnone

[11] Patent Number: 4,754,713
[45] Date of Patent: Jul. 5, 1988

[54] MOVABLE PLATFORM WITH ADJUSTABLE LEGS

[76] Inventor: Catherine M. Chatenay épouse Compagnone, 370 rue Mouffetard, 75005 Paris, France

[21] Appl. No.: 900,802

[22] Filed: Aug. 27, 1986

[30] Foreign Application Priority Data

Sep. 20, 1985 [FR] France .................. 85 13981

[51] Int. Cl.⁴ .................................. A47B 9/00
[52] U.S. Cl. ........................ 108/144; 248/188.2
[58] Field of Search ............. 108/144, 116, 106, 117, 108/145; 248/188.1, 188.2, 188.5, 188.6, 129; 318/4, 5, 85, 625; 187/113, 112, 110

[56] References Cited

U.S. PATENT DOCUMENTS

| 319,133 | 6/1885 | Schmitt et al. | 108/96 |
|---|---|---|---|
| 554,661 | 2/1896 | Doolittle | 108/95 X |
| 732,227 | 6/1903 | Shafer et al. | 108/95 X |
| 2,675,285 | 4/1954 | Terry et al. | 108/144 X |
| 2,947,099 | 8/1960 | Lancaster | 108/95 |
| 3,152,833 | 10/1964 | Creveling et al. | 108/117 X |
| 3,368,499 | 2/1968 | Rollins et al. | 248/188.2 X |
| 3,510,129 | 5/1970 | Reuther | 108/144 X |
| 3,724,007 | 4/1973 | Kuss | 248/188.2 X |
| 3,944,896 | 3/1976 | Rodel | 318/85 |
| 4,135,118 | 1/1979 | Seeger et al. | 318/85 |
| 4,477,045 | 10/1984 | Karasawa et al. | 108/144 |
| 4,558,648 | 12/1985 | Franklin et al. | 108/144 X |
| 4,571,087 | 2/1986 | Ranney | 108/145 X |
| 4,577,821 | 3/1986 | Edmo et al. | 108/145 X |
| 4,593,626 | 6/1986 | Kouroupis et al. | 108/144 X |
| 4,597,553 | 7/1986 | Rorabaugh | 248/188.2 X |

FOREIGN PATENT DOCUMENTS

| 197555 | 5/1958 | Austria | 108/144 |
|---|---|---|---|
| 2363445 | 5/1978 | France | 108/95 |
| 132084 | 10/1979 | Japan | 318/4 |
| 15639 | of 1909 | United Kingdom | 108/144 |

*Primary Examiner*—Kenneth J. Dorner
*Assistant Examiner*—José V. Chen
*Attorney, Agent, or Firm*—Fisher, Christen & Sabol

[57] ABSTRACT

An extendable and retractable structure with an orientable plane, adapted to cooperate with a holding surface. Connection arrangement are connected to the plane and the holding surfce. The structure includes connecting assemblies of at least two rigid arms of constant length, at least two linearly extendable and retractable actuators which are independent of each other, and controlling device connected to actuators.

3 Claims, 7 Drawing Sheets

MOVABLE PLATFORM WITH ADJUSTABLE LEGS

The present invention relates to extensible and retractable structures with orientable plane cooperating with a holding surface and of which the applications are numerous, for example for transporting or handling equipment which is often cumbersome and heavy, for supporting loads, for the maintenance of various equipment of difficult access, etc. . . . Such structures find application in the majority of technical fields and industries where it is necessary to transfer, support, lift, hold . . . one or more loads.

Structures called scissor-type elevating platforms exist which comprise, in particular, a platform adapted to receive a load, rigid uprights connected on the one hand, at one of their ends, to the platform and on the other hand, at the other of their ends to a base resting on a holding surface such as the ground. In these known structures, the uprights are assembled in cross or X-form, and these uprights are articulated about a shaft.

Depending on whether these structures are designed to receive and/or transfer light or heavy loads, two uprights of the same assembly may be arranged opposite two other uprights of another same assembly, crosspieces connecting the two assemblies rigidifying the framework of the structure. Mechanical connection of the two uprights, disposed in cross fashion, of each assembly is provided by means of a shaft adapted to pivot about an axis.

A means for raising the level of the platform with respect to the ground ensures the extension or retraction of the structure or elevating platform, for example by means of one or more jacks. These latter are articulated by a first of their ends on a crosspiece fast with a first upright, whilst the second of their ends is connected to a crosspiece fast with a second upright, the first and the second upright defining the cross-assembly. In this way, when the jacks receive an order to retract or extend, their respective rod pulls or pushes on the corresponding upright, driving the platform into low or high position by means of the common articulation of the uprights.

Structures of the elevating platform type exist, comprising two or more scissor assemblies disposed one above the other in series operating wih the aid of a plurality of jacks in the same manner as before, and which thus make it possible to attain a considerable height of elevation of the platform with respect to the ground. Similarly, elevating platforms exist which comprise two or more scissor assemblies disposed side by side operating with the aid of a plurality of jacks, and enabling considerable loads of large dimensions to be supported.

Many possible configurations of this type of structure are known at present, and each of these configurations is adapted to a precise need as a function of the two principal criteria which are the weight and dimensions of the load to be supported, to which the height of use is possibly added.

These structures give satisfactory results, but present appreciable drawbacks. A first drawback appears at the level of the articulation shaft of the uprights, as this shaft works under considerable mechanical stresses, particularly shear. This results in the necessity to use overdimensioned shafts and uprights in order to reduce the risks of breaks, but this involves a second drawback by the use of parts which render the whole of the structure heavy (use of powerful and therefore voluminous jacks, motors for driving the various jacks adapted accordingly). This type of elevating platform is thus imposing, expensive and occupies a large volume, rendering access and maintenance operations difficult, if not impossible, under the platform and leads to a loss of room.

Another drawback of the known elevating platforms lies in the relatively limited stroke defined between the low position and the high position of the platform with respect to the ground. In fact, the position occupied by two same uprights connected together in rotation in high position is not perpendicular to the ground, but generally forms an angle close to 45° with respect thereto; consequently, the real length of the uprights is not exploited (a perpendicular position of the uprights is not desirable since it would lead to instability of the elevating platform). The use of longer uprights in order to increase the available stroke renders the structure heavier per se, with the drawbacks mentioned hereinabove.

The folded position of this type of elevating platform is also of large dimensions due to the use of overdimensioned parts and elements.

The scissor-type elevating platforms are poorly adapted to large dimensions and in particular to large lengths. In fact, the efforts exerted on the pivot pins become considerable due to the size of the lever of each upright of the scissors which leads to an overdimensioning of all the parts. The structure of the elevating platform is thus considerably redimensioned to take into account, in low position, the great distance between the fulcrums and, in high position, the amount of overhang. These defects connected with the use of such large-dimensioned elevating platforms, lead to treating the problem of the large lengths as an addition of several sub-multiples of these large lengths. Several elevating platforms of smaller dimensions are rigidly joined to one another, but defects in horizontal orientation appear in that case which are mainly due to the common synchronization of the jacks of each assembly during operation thereof. This then causes an inclination of the plane defined by the platform with respect to the plane defined by the ground.

Certain elevating platforms are equipped, in order to overcome this defect, with electronic and mechanical devices for synchronizing the lifting jacks, which are sophisticated and of high cost.

Similarly, in the case of using platforms adapted to move over a reference surface presenting surface irregularities and defects, the platform consequently follows these irregularities and defects and does not remain parallel to the horizontal reference plane. In the case of difference in level of the ground (a step, for example), it may then be necessary to use two mobile elevating platforms (one at each level).

In order to overcome the various drawbacks set forth hereinabove, it is an object of the present invention to propose an extensible and retractable, mobile structure, with orientable plane, which is both rigid and light, easy to use, of small dimensions both in unfolded position and in folded position, in order to allow the broadest use of the volumes created by its various configurations, and comprising means for monitoring and detecting its movements, particularly the inclinations of its orientable plane, and of reduced cost.

To that end, according to the invention, the extensible and retractable structure with orientable plane, adapted to cooperate with a holding surface, comprising connecting means connected respectively to said plane and to said holding surface, is noteworthy in that it comprises:

connecting means constituted by at least two rigid arms of constant length, independent of each other, each being on the one hand articulated by a first end on said plane and on the other hand cooperating with said holding surface by its second end by means of a connection of translation, the articulations of the first ends of said arms on said plane being remote from one another, at least two linearly extensible and retractable actuation means, independent of one another, each actuation means being associated respectively with an arm and being, on the one hand, articulated on said plane by a first end disposed between the periphery of the plane and the articulation of the first end of said arms, and on the other hand, connected by its second end to the respective arm in the vicinity of said holding surface, and, control means connected to the actuation means, ensuring, thanks to the arrangement of the articulations of the first ends of said arms and said actuation means on said plane, the displacement of said plane between a first folded position near the holding surface and a second unfolded position remote from the holding surface.

At the second end of each rigid arm there is advantageously provided a rolling or slide means articulated on said end, said rolling or slide means cooperating with said holding surface. The second end of each actuation means is preferably respectively articulated on the second end of each arm on said rolling or sliding means.

In a variant embodiment, the structure comprises a first and a second assembly, each constituted respectively by at least one rigid arm and one actuation means, the first assembly being disposed symmetrically to the second assembly with respect to a plane perpendicular to the orientable plane, passing through its median axis.

In another variant embodiment, it comprises three assemblies, each constituted respectively by at least one rigid arm and one actuation means, each assembly being disposed substantially at 120° from one another with respect to an axis at right angles to said plane.

In order to support considerable loads and to increase the stability of the structure, each assembly comprises two rigid arms associated with two actuation means.

In another embodiment, substantially reducing the dimensions of the structure in folded position, the first ends of said rigid arms and said actuation means of each assembly are articulated on a carriage cooperating with said plane, said carriage being adapted to slide parallel to said plane, between a first position close to the centre of the plane and a second position located in the vicinity of the periphery of said plane.

The structure according to the invention advantageously comprises a device for synchronizing the displacement of the plurality of the actuation means, comprising means for monitoring and detecting the position occupied by said plane with respect to the horizontal in the course of extension or retraction, said means being connected to the control means acting on the actuation means.

In a preferred embodiment, the monitoring and detection means comprise, on the one hand, at least two liquid levels which communicate together via a pipe, and which are disposed in the vicinity of the periphery of said plane, and on the other hand, sensors of which each is rigidly associated with a level, which sensors are adapted to deliver an electric signal to an electric control case connected to the control means when a predetermined difference in distance is produced between said levels and said sensors.

The monitoring and detection means comprise two assemblies, each of at least two levels, a sensor being associated with each level, one of the assemblies acting during extension of the actuation means, the other of the assemblies acting during retraction of the actuation means.

The invention will be more readily understood on reading the following description with reference to the accompanying drawings, in which.

FIGS. 9A, 9B, and 9C show a variant embodiment of the structure in three positions thereof.

FIG. 9D shows a side view of FIG. 9C.

Figure 10:
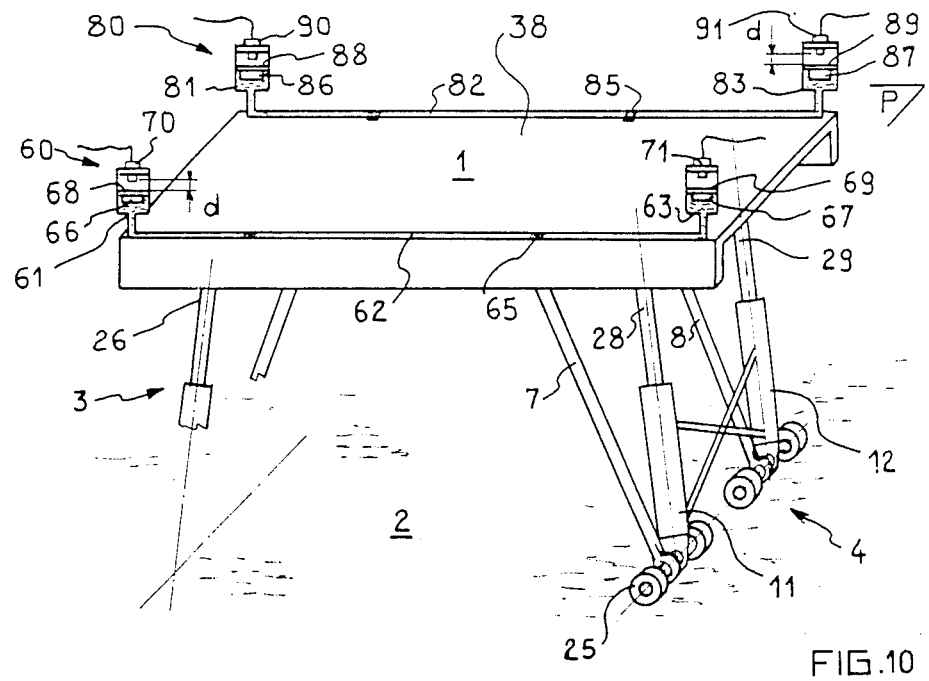

FIG. 10 shows, in part perspective, a view of the structure comprising a device for synchronizing the actuation means.

Figure 11:
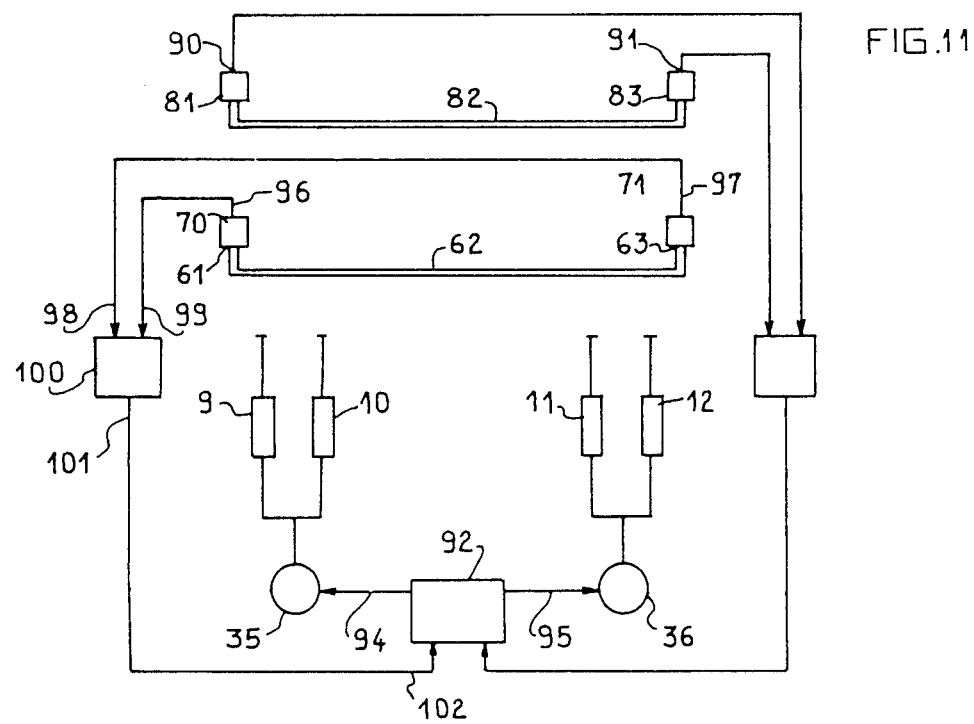

FIG. 11 schematically shows the operation of a synchronization device according to the invention.

Figure 12:
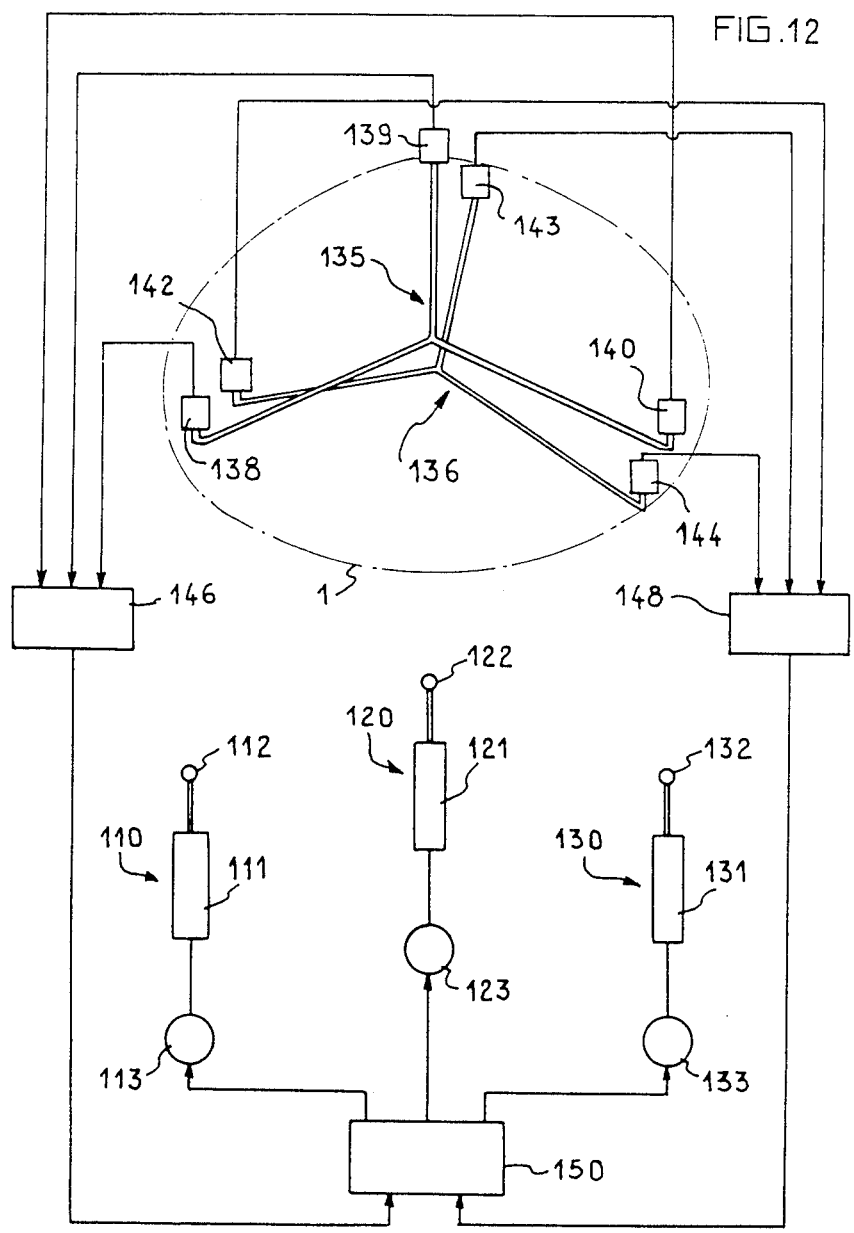

FIG. 12 schematically shows a variant embodiment of the structure provided with a synchronization device.

Figure 13A:
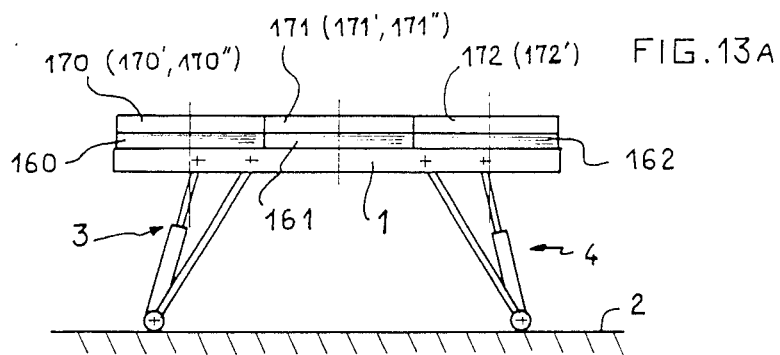
Figure 13B:
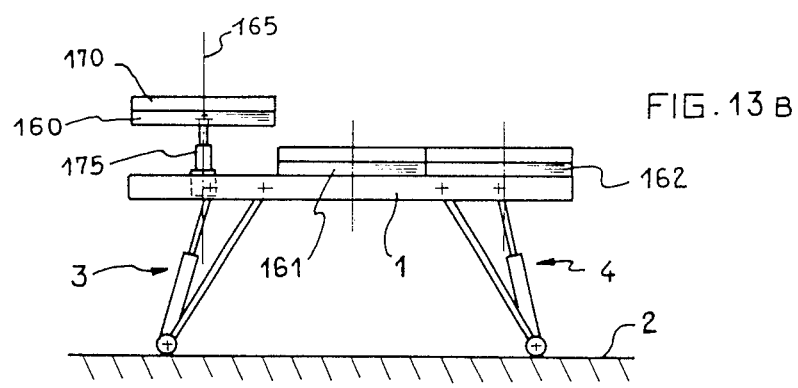
Figure 13C:
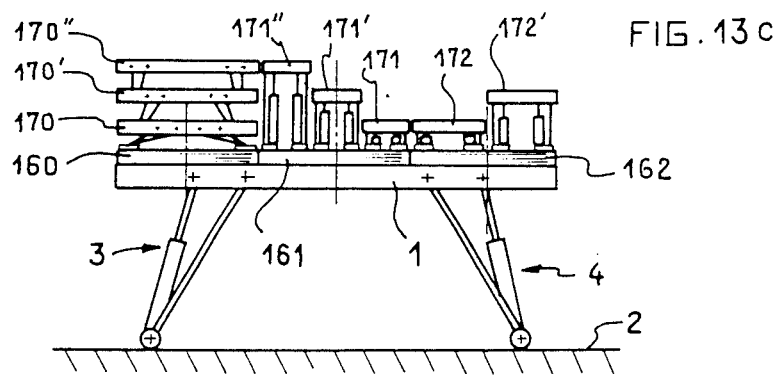

FIGS. 13A, 13B, 13C schematically show a particular application of the structure in three positions thereof.

Figure 14:
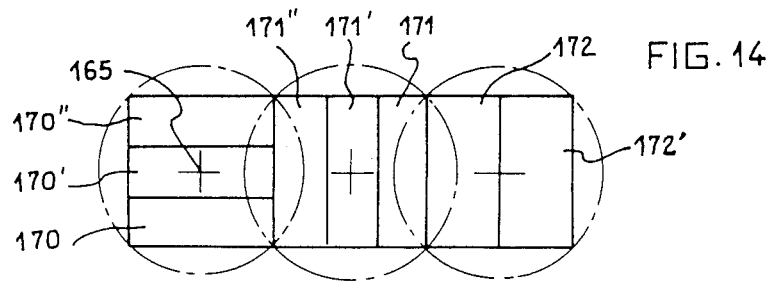

FIG. 14 shows a plan view of FIG. 13C.

It will firstly be specified that, in the drawings, like references designate like elements.

Figure 1:
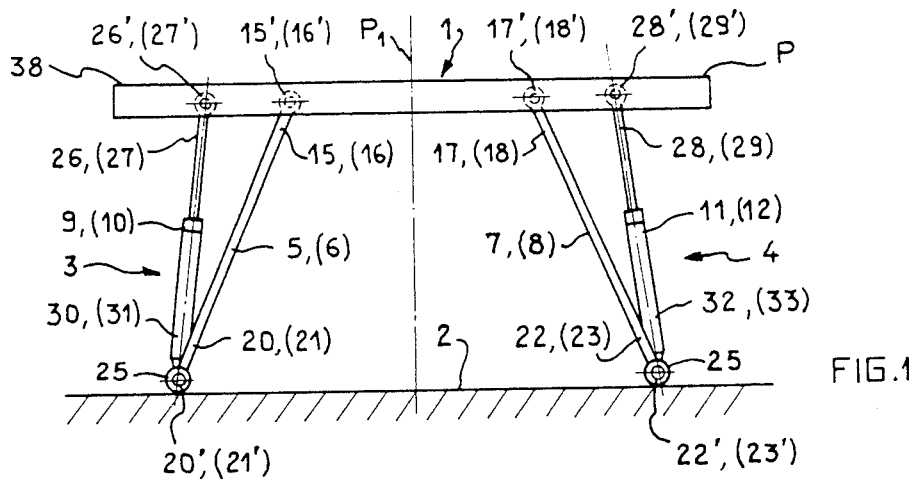
FIG. 1 shows a view of the extensible and retractable structure with orientable plane according to the invention, in unfolded position.

Referring now to the drawings, FIG. 1 shows a view of the structure according to the invention, in high or unfolded position, which comprises an orientable plane P for example defined by a platform 1 resting on a holding surface such as the ground 2 via two connecting means 3 and 4. The term platform designates both a flat surface which is rectangular or of any other geometry (circular), and profiles of various cross-sections connected together by perpendicular crosspieces, rigid frames, etc. . .

Each connecting means 3 and 4 is constituted respectively by at least one rigid arm of constant length, and at least one actuation means such as a jack.

Figure 2:
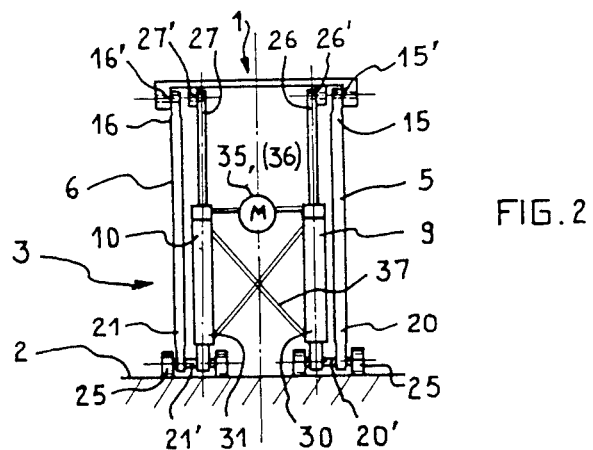
FIG. 2 shows a side view of FIG. 1.

More precisely, by combining FIGS. 1 and 2, each assembly of connecting means 3 and 4 respectively comprises two rigid arms 5, 6 and 7, 8 and two jacks 9, 10 and 11, 12.

The two assemblies 3 and 4 are disposed symmetrically with respect to a plane P1 perpendicular to the plane P defined by the platform, (a first assembly 3 to the left of plane P1 and a second assembly 4 to the right of this plane), plane P1 passing through the centre of the platform which is substantially parallel to the plane of the holding surface or ground 2.

Each respective first end 15, 16, 17, 18 of the rigid arms 5, 6, 7, 8 is articulated about a pivot pin 15', 16', 17', 18' cooperating with the platform, the four pins being parallel to plane P of platform 1.

Each respective second end 20, 21, 22, 23 of the rigid arms 5, 6, 7, 8 is connected about a pivot pin 20', 21', 22', 23' bearing at its ends means for translation and/or rolling adapted to cooperate with ground 2, for example wheels 25.

In the same way, each respective first end 26, 27, 28, 29 of jacks 9, 10, 11, 12 is articulated about a pivot pin 26', 27', 28', 29' cooperating with platform 1. Moreover, pivot pins 26' to 29' of the jacks are disposed in a zone located between the outer periphery of the platform and the pivot pins 15' to 18' of the rigid arms. Each respective second end 30, 31, 32, 33 of jacks 9, 10, 11, 12 is connected about the same pin 20', 21', 22', 23' as each second end of the rigid arms.

In order to rigidify each assembly 3 and 4, bars 37 are associated with each jack of the same assembly and are disposed in cross-fashion.

Jacks 9, 10, 11, 12 are for example of the screw type and are controlled in two's (i.e. jacks 9, 10 of one assembly, and jacks 11, 12 of another assembly) by means of an electric motor 35 and 36 respectively. Hydraulic jacks controlled by a pump may also be envisaged without departing from the scope of the invention. These two motors actuate the retraction or extension of the rods of each assembly of jacks 9, 10 and 11, 12 via an electrical link with an electric control unit manipulated by an operator.

Figure 3:
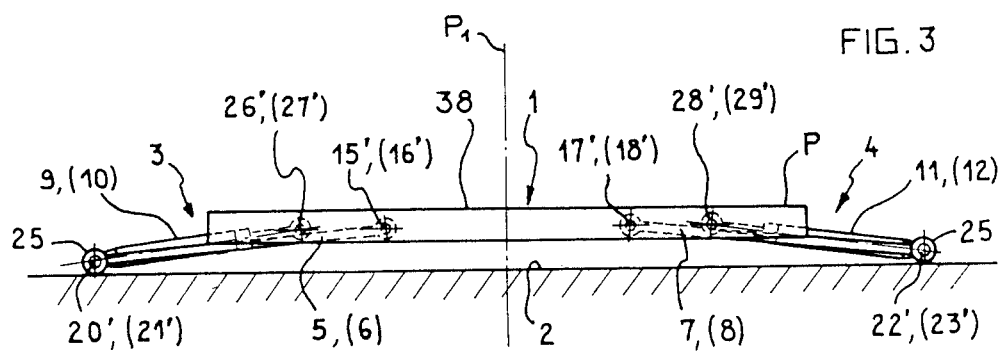
FIG. 3 shows a view of the structure in folded position.

FIGS. 1 and 3 show the two extreme positions which the structure may occupy (FIG. 1 the unfolded position, FIG. 3 the folded position). The structure operates as follows: after having supplied the electric motor 35 and 36 of each respective assembly 3 and 4, (motors rotating in the same direction and at the same speed), jacks 9, 10, 11, 12 move linearly by means of their screw-nut systems connected to motors 35 and 36 and symmetrically with respect to plane P1, driving the platform 1 upwardly or downwardly depending on the anti-clockwise or clockwise direction of the motors.

The first ends of the arms and jacks pivot about their respective pivot pins connected to the platform, whilst the second ends of these same arms and jacks move over the holding surface or ground 2 via the wheels 25 to which they are connected. The second ends of each respective assembly move closer to or away from plane P1 so that assemblies 3 and 4 occupy a substantially vertical position when the platform is in unfolded position, and a substantially horizontal position, parallel to ground 2, when the platform is in folded position.

Of course, the outer face 38 of platform 1 on which any load is placed, may occupy all the intermediate positions between the two extreme positions mentioned above, by acting more or less on the retraction or extension of the jacks. Blocking means (not shown in the drawings) are disposed on the rolling means 25 in order to avoid any undesirable movement of the structure with respect to the ground.

The advantages offered by such a structure over one of the prior art defined hereinbefore are clear: simple design, reduced dimensions, mobility, no problems of mechanical stresses (shear), etc...

Figure 4:
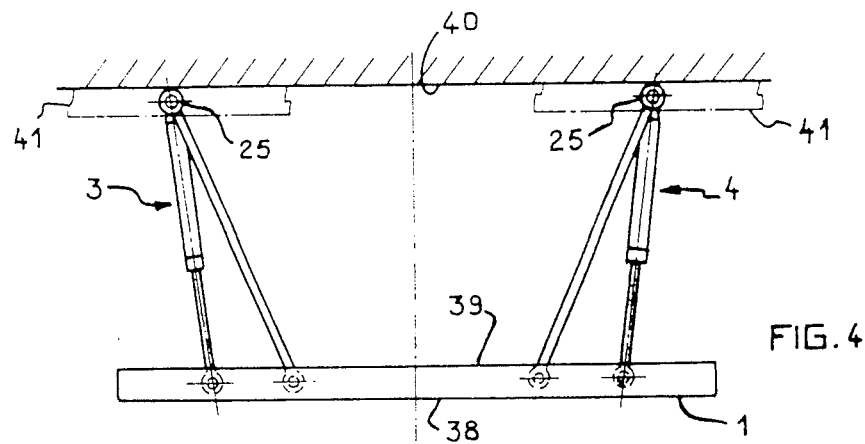
FIG. 4 shows a variant assembly of the structure.

FIG. 4 shows a variant of the structure according to the invention. In fact, with respect to FIGS. 1 to 3, the structure is connected to a holding surface such as a ceiling 40 on which are arranged rails 41 schematically shown in light broken lines. Rolling means bearing wheels 25 roll in these rails 41. The other elements constituting the structure are identical to those previously described by FIGS. 1 to 3.

The load or loads may be olaced on the inner face 39 of the platform 1 or even on the outer face 38 thereof, in that case being held by fastening means (not shown).

Figure 5:
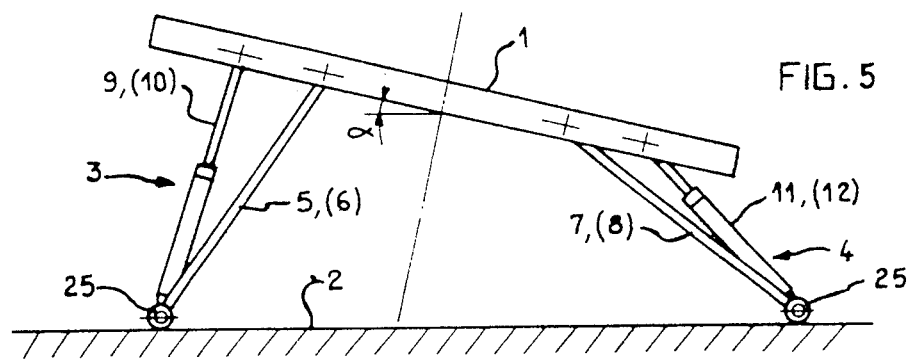
FIGS. 5 and 6 show two intermediate positions occupied by the structure.

FIG. 5 shows an intermediate position that platform 1 may occupy in the case of particular applications where it is desired to have a platform inclined by a certain angle $\alpha$ with respect to the holding surface. To obtain such a position, jacks 9, 10 of assembly 3 are more extended, whilst jacks 11, 12 of assembly 4 are more retracted. The respective motors 35, 36 of each assembly may be actuated independently of each other to obtain any desired inclination of plane P defined by platform 1 with respect to the plane defined by holding surface 2.

Figure 6:
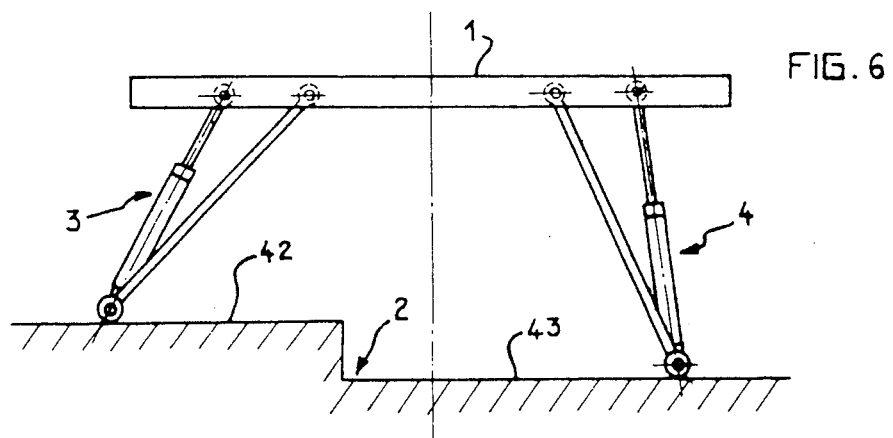

FIG. 6 shows a possible configuration of holding surface 2, wherein, in order to conserve a parallel plane P of platform 1 with respect to the plane of the holding surface 2 defined by steps 42 and 43, jacks 9, 10 of assembly 3 are retracted by means of motor 35 until the variation in level between the two steps 42 and 43 are compensated, by a more pronounced inclination of assembly 3 with respect to assembly 4.

Figure 7:
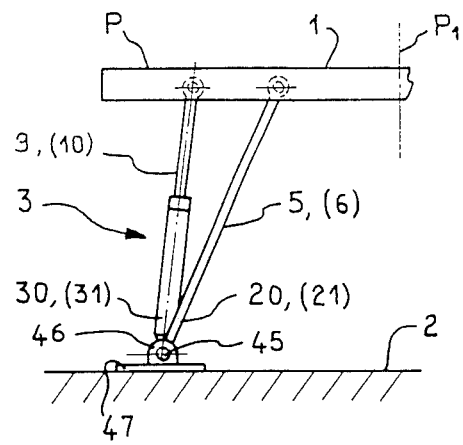
FIG. 7 shows another embodiment of one of the elements constituting the structure.

FIG. 7 shows a different embodiment of the rolling means 25 of the structure which has been shown partially. The second ends 20 to 23 of arms 5 to 8 and the second ends 30 to 33 of jacks 9 to 12 are each mounted respectively on a pivot pin 45 borne by a fork joint 46 fast with a base plate 47. This embodiment gives the structure a better bearing surface with respect to the holding surface. This base-plate assembly may equip one, several or all the assemblies of the structure depending on the type of application for which it is intended.

Figure 8:
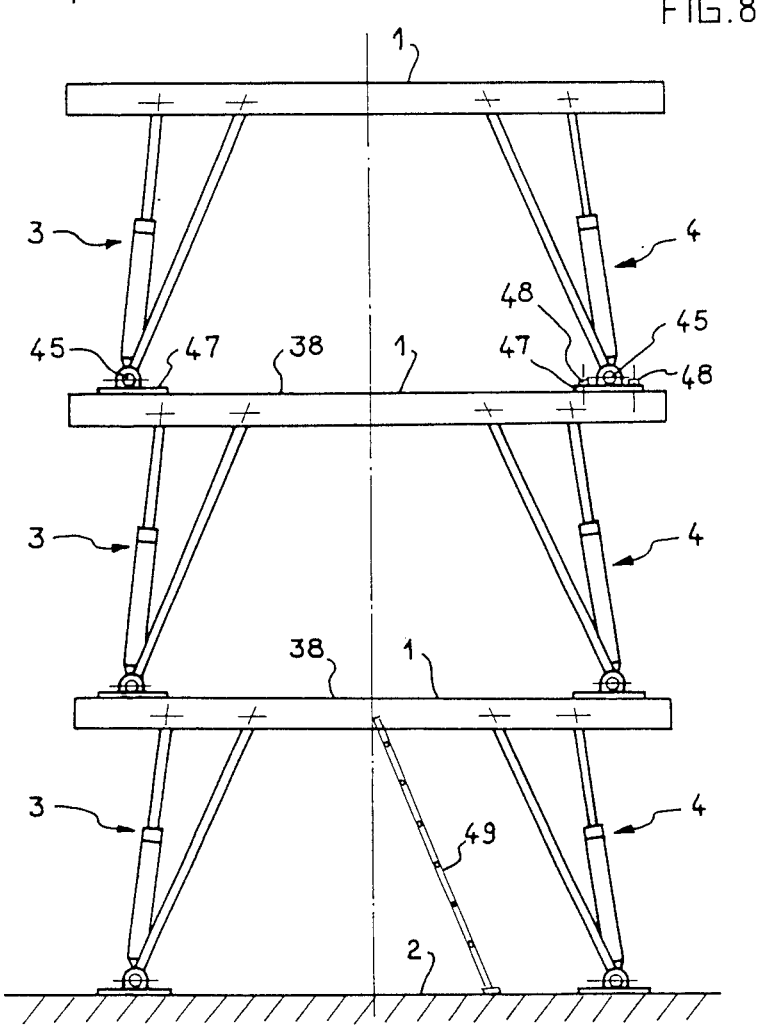
FIG. 8 shows a particular application of the structure.

FIG. 8 illustrates a particular application of a plurality of structures, in the present case three, disposed respectively one above the other and comprising as rolling means 25 base plates 47 cooperating on the outer face 38 of the platform located therebelow, with the exception of the base plates of the first structure which rest directly on the holding surface 2. Blocking means are provided (shown schematically on one base plate) for example bolts 48 passing through plates 47 to cooperate with the corresponding platform. Other blocking means may of course be envisaged such as stabilizing bars rigidifying the structure by abutting on the one hand on the rigid arms and on the other hand on the outer face 38 of the platforms 1. This type of application is particularly advantageous for erecting scaffolding, it further being possible to set the height of each platform to determined levels. Access means, in the present case ladders 49, are provided to communicate from one structure to the other, as well as guard rails (not shown) arranged around the periphery of each platform.

The structure as described hereinbefore comprises two assemblies of two arms associated with two jacks. Without departing from the scope of the invention, the structure may comprise one single arm associated with a jack, for example depending on the different possible applications allowed by this structure. Similarly, the structure may comprise three assemblies respectively constituted by at least one arm associated with a jack, each assembly being disposed substantially at 120° from one another, the platform being able to be of circular section. The first ends of each arm and jack will preferably be articulated on the platform by means of a swivel joint thus allowing a total orientation of the plane defined by the platform with respect to the holding surface. The second ends of each assembly may also be articulated on a respective swivel joint on roller means or base plates depending on the particular application for which the structure is intended. The plurality of possible combinations obtained by this type of structure constitutes a considerable advantage over that of the prior art.

FIGS. 9A, 9B, 9C and 9D show a variant embodiment of the structure according to the invention in three positions: a first low, folded, retracted position, used when transporting the structure; a second low, folded, extended position before assembly; a third high, operational, unfolded position. This variant embodiment differs from the preceding one by the use of a sliding carriage mounted beneath the platform fitted on each assembly. More precisely, the first ends 15, 16 and 17, 18 respectively of the rigid arms 5, 6 and 7, 8 as well as the first ends 26, 27 and 28, 29 respectively of jacks 9, 10 and 11, 12 of each assembly 3 and 4 are pivotally mounted on the sides 50, 51 of a carriage 52, 53 about pins 54, 55 for carriage 52 connected to assembly 3 and 56, 57 for carriage 53 connected to assembly 4. Each carriage 52 and 53 rests via wheels or rollers 58 on guide angles 59 arranged on the platform (FIG. 9D).

Each carriage may move between the two extreme positions of operation, defined by the periphery of the platform, i.e. the lateral edge, and by the median axis, intersection of plane P1 with plane P, and may occupy all intermediate positions thanks to blocking means 44 such as pins passing through the angles to come into contact with the rolling means of the carriages.

Moreover, this variant embodiment enables the structure to occupy a reduced volume when it is in low, folded position (FIG. 9A) as the assemblies 3 and 4 are retracted by sliding by means of their respective carriage, one opposite the other, beneath the platform. This variant embodiment does not affect the various possibilities of position and orientation of the structure, particularly those illustrated by FIGS. 5, 6 and 8.

With reference to FIG. 10, the structure comprises a device for synchronizing the actuation means which, on the one hand, ensures the extension or retraction of the or each respective jack of each assembly in identical manner and, on the other hand, obtains and conserves a horizontal reference position of the plane P of the platform, as will be set forth hereinafter.

This device for synchronizing the displacement of the actuation means comprises means for monitoring and detecting the horizontality of the plane P to which the first ends 26 to 29 of jacks 9 to 12 as well as the first ends 15 to 18 of arms 5 to 8 are connected by the pivot pins.

Two identical monitoring and detection means 60, 80 are arranged on the outer face 38 of the platform 1, a first means 60 acting during extension of the jacks, and a second means 80 acting during retraction of the jacks. To be more precise, each means or assembly 60 and 80 respectively comprises two levels 61, 63 and 81, 83 communicating together via a pipe 62, 82 respectively maintained on the outer face 38 by means of fixing collar 65, 85. The inner volumes of the levels cooperating with their pipe are filled with a liquid, for example water, each level 61, 63 and 81, 83 respectively contains a float 66, 67 and 86, 87 covered respectively with a metal disc 68, 69 and 88, 89 of section slightly smaller than the section of the levels. At the top of the latter, a sensor such as a proximity detector 70, 71 and 90, 91, is hermetically connected.

The horizontal orientation of the plane P defined by platform 1 is ensured when the distance "d" separating each metal disc connected to the float, from the proximity detector is identical in each level 61, 63 and 81, 83.

FIG. 11 schematically illustrates the operation of this synchronizing device. For example, the operator wishes to raise the structure from the low, folded position to the high, unfolded position.

As mentioned above, one single control and detection means is used for lifting, in the present case means 60. An electric control box 92 provided with switches (not shown), operates motors 35, 36 of each assembly via connections 94, 95. These motors 35, 36 thus drive the rods of their respective jacks, namely jacks 9, 10 for motor 35 and jacks 11, 12 for motor 36.

Platform 1, connected to jacks by the pivot pins, rises, and in the case of identical extension of the jack rods (same speed of rotation of the motors), the height of the liquid in each of the levels 61, 63 of pipe 62 remains substantially identical, the distance "d" between each metal disc and the detector also remaining substantially identical. In this hypothesis, the two detectors 70, 71, of which the respective outputs 96, 97 are connected to two inputs 98, 99 of the same electric logic gate 100, deliver the same electric signal.

In this way, the output 101 of the logic gate 100 transmits a signal to the input 102 of the electric control box 92 indicating a rise of each assembly of jacks in correct synchronization, hence an ideal reference plane P of the platform.

In the event of the speed of extension of the jacks of an assembly being different (further to possible technical problems) for example a lower speed of extension of jacks 9, 10 of assembly 3, plane P of platform 1 inclines about its median axis, since jacks 11, 12 extend more rapidly. As the position of the floats 66, 67, provided with their respective metal disc 68, 69, always conserves the same horizontal reference level, detector 70 moves sufficiently close to metal disc 68 to deliver at its output 96 an electric signal different from the one emitted by detector 71.

The electric logic gate 100, receiving two different signals, tips; the electric control box receiving a different electric signal controls stoppage of motor 36, stopping the rise of jacks 11, 12 of assembly 4 up to the moment when jacks 9, 10 will have re-established balance of level of the platform, i.e. the moment when the electric signal 96, 97 of the two detectors will have become identical again (the distance "d" then being substantially identical in each level) allowing tipping of logic gate 100 in its operational position, namely the delivery of a correct electric signal or electric box 92 re-establishing the synchronized operation of the two motors.

The structure operates in reverse in identical manner during its passage from high position to low position, the monitoring and detection means 80 being employed.

The advantages of such a device are appreciable; they allow lift or descent of the platform in a perfect horizontal plane determined by the plane formed by the surface of the water contained in each level thus providing safety of displacement when any load is placed on the platform. Moreover, only simple mechanical and electrical elements are used in this device whilst those used on prior art structures, when they exist, are technically more complex and expensive.

Finally, FIG. 12 illustrates a variant embodiment of the structure on which a device for synchronizing the actuation means is fitted. This structure is constituted by three assemblies 110, 120, 130, each comprising, for example, jack 111, 121, 131 associated with a rigid arm (not shown in the Figure) disposed substantially at 120° from one another with respect to an axis at right angles to plane P. The first ends of each assembly are articulated, about a swivel joint 112, 122, 132 respectively, on platform 1 having a circular configuration. Each jack is supplied by an electric motor 113, 123, 133. The second ends of each assembly are articulated on the rolling means or base plates in contact with the ground. This structure and in particular the actuation means operate identically to those described hereinabove.

A synchronizing device is disposed on platform 1, and comprises two monitoring and detection means 135, 136, the first controlling the lift of the platform, the second controlling the descent thereof. Each means comprises three levels communicating with one another via pipes, thus ensuring an identical height of liquid in the three levels. As in the preceding embodiment, a proximity detector is arranged on each level of the two means, in the present case a detector 138, 139, 140 on means 135 and a detector 142, 143, 144 on means 136.

The output of each detector of a same means is connected to the input of an electric logic gate 146 for detectors 138, 139, 140 of means 135, and 148 for detectors 142, 143, 144 of means 136, respectively. The respective output of these logic gates 146 and 148 is connected to an electric control box 150 which makes it possible to act on motors 113, 123, 133 of each assembly. The process of operation is similar to that described with reference to FIG. 11; when the distance separating the proximity detector and the float placed on the liquid of each level is constant, the signals delivered by the three detectors 138, 139, 140 to the logic gate 146 are identical, which in turn transmits a signal to the electric control box 150 stipulating that the displacement and synchronization of each jack is correct.

In the case of a drop from synchronism of a jack, for example jack 131, during descent of the platform, the means 136 acting, a signal coming from detector 144 is then transmitted to the logic gate 148 which, by comparison with the signals coming from detectors 142, 143, sends a significant electric signal to the electric control box 150 which thus determines the defective jack, namely jack 131. The two motors 113, 123 respectively controlling jacks 111 and 121 are slowed down or even stopped, in order to allow re-establishment of the horizontal position of the platform by means of motor 133 of jack 131.

This type of operation may be repeated as many times as necessary if one of the motors, principally, despite the fact that they are identical, presents temporary technical defects in operation. Of course, as mentioned previously with regard to FIG. 11, this synchronizing device ensures a perfect horizontal reference of the platform and therefore a permanent monitoring of its horizontality.

The applications of this structure according to the invention with its different variant embodiments are multiple. It suffices to fit the number of assemblies with a platform arranged for the various needs, for transferring loads, supporting containers, vehicles (elevator platform), positioning stands or stepped rows of seats, transporting passengers, erecting scaffolding, etc. . .

A particularly appropriate application of this type of structures is the use thereof as stepped rows of seats for example, in theatres, auditoriums or the like. In that case, a plurality of structures is arranged in front of or around the stage depending on its configuration. By modulating the means for lifting each row of structures, an assembly of stepped rows of seats is produced in which the structures of the first row located nearest the stage occupy a folded position, progressively presenting an unfolded position for the row of structures most remote from the stage, this for the same reference level of the ground.

More precisely, an advantageous embodiment is schematically shown in FIGS. 13A, 13B, 13C and 14 which show a structure according to the invention of which platform 1 is provided with three rotating plates 160, 161, 162 of square section, adjacent one another, each respectively supporting superstructures 170, 171, 172. The number of rotating plates disposed on each structure is a function of the total ratio between the length and the width of the structure, in the same way to the number of superstructures disposed on each rotating plate is an integer which is a function of the ratio between the length of a superstructure, preferably equal to the side of the rotating plate, by its width.

By way of example, three adjacent rotating plates 160, 161, 162 are shown, of which the first two each support three superstructures shown in folded position, 170, 170', 170" and 171, 171', 171" respectively, and the third plate supports two superstructures 172, 172' likewise in folded position. Of course, the possibilities of arrangement of the number of rotating plates and of the number of superstructures may be different.

Figure 9:
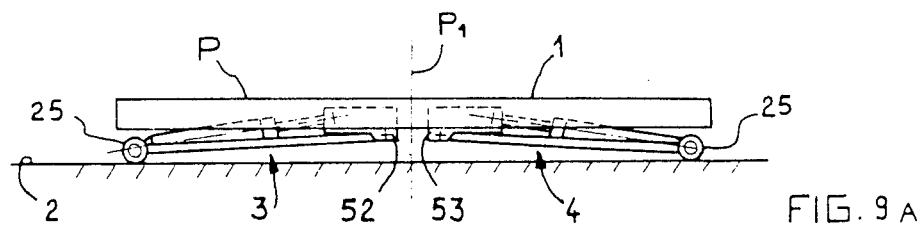
Figure 9:
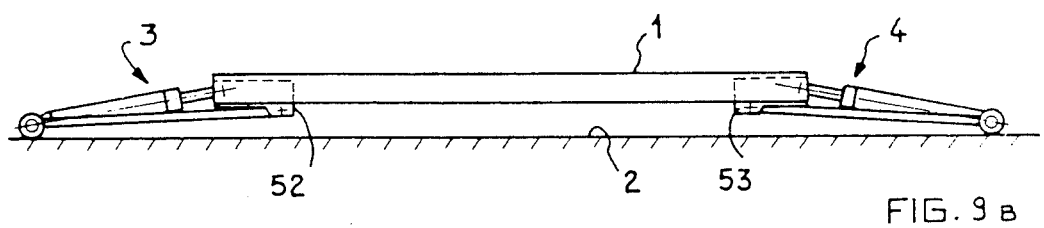
Figure 9:
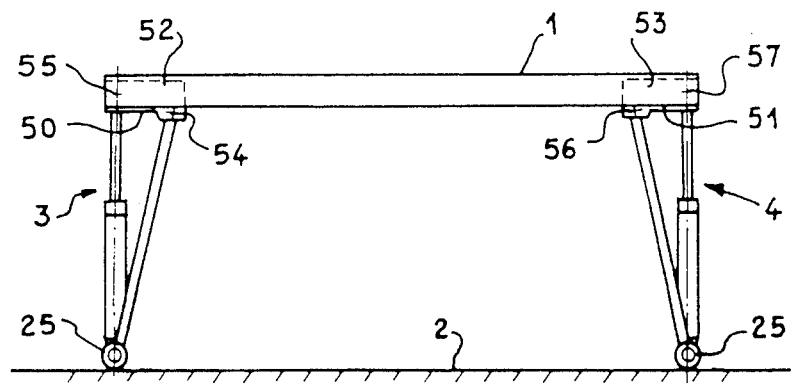
Figure 9:
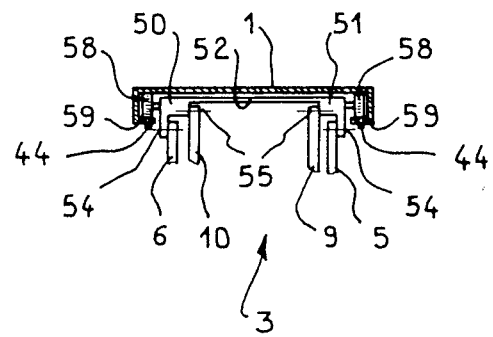

Moreover, these superstructures may be made identically to the structure according to the invention such as the one shown in FIGS. 1, 7 or 9, but not exclusively. Seats (not shown in these Figures) are disposed in one or more rows on each superstructure.

In modern theatres or auditoriums in which different performances are given, it is necessary to modify the shape of the stage. Consequently, the stepped rows of seats must be oriented accordingly and the addition of rotating plates considerably simplifies the handling operations. It is possible to orient the superstructures fast with each plate in four different directions corresponding to the four sides defining the geometry of each plate.

To carry out these operations, a jack 175 of the telescopic type is provided beneath each rotating plate, connected by one of its ends to platform 1 of the principal structure and by the other of its ends to the corresponding rotating plate. One jack only has been shown beneath plate 160, FIG. 13B. Each plate is thus independent of one another. Jack 175 lifts the assembly constituted by the rotating plate 160 and superstructures 170, 170', 170" along an axis 165 at right angles to the orientable plane of the structure, by a height sufficient then to allow the rotation of plate 160 through 90°, 180° or 270° with respect to the structure without risk of hindering the adjacent plate 161 and superstructures 171, 171', 171". FIG. 14 shows the circular path described by each rotating plate of square section, in light chain-dotted lines, thus justifying the use of a lifting means.

Once plate 160 is raised (FIG. 13B), it is rotated about orthogonal axis 165 for example by means of an electric motor (not shown) or by means of jack 175 in that case performing a function of rotation, until the desired orientation is obtained. At that moment, jack 175 is actuated to ensure descent of the rotating plate 160 on the orientable plane of the structure. Operation and orientation of the other plates is identical.

The superstructures (FIG. 13C) are arranged on each plate in the same manner as the structure according to the invention, by acting more or less on the lifting means thus making it possible to adapt the level of each superstructure correctly.

These rotating plates advantageously rotate about their axis of rotation without difficulty thanks to the means for monitoring and detecting the position occupied by platform 1 of the structure which defines a perfect horizontal plane, as described hereinbefore. The axes of rotation 165 of the rotating plates are thus perpendicular to the plane of the platform, allowing a rotation of these latter under the action of a minimum torque.

In practice, the different superstructures are most often oriented in the same direction and are in the same number on each plate. An application employing structures and superstructures having rectangular forms has been described, but said structures and superstructures may present different geometrical shapes, for example curvilinear.

An electronic installation may also be provided, connected to the means for lifting the different structures and superstructures and to the means for orienting and lifting the rotating plates which would thus enable these various elements to be modulated in accordance with programs determined for each type of stage in order to render the different handling operations automatic.

What is claimed is:

1. An extendable and retractable structure with orientable plane, adapted to cooperate with a holding surface, comprising attachment means connected respectively to said plane and to said holding surface, comprising:

connecting means constituted by at least two rigid arms of constant length, independent of each other, each being articulated by a first end on said plane and cooperating with said holding surface by its second end by means of a translating connection, the articulations of the first ends of said arms on said plane being remote from one another;

at least two linerarly extendable and retractable actuation means, independent of one another each actuation means being associated respectively with an arm and being, on the one hand, articulated on said plane by a first end disposed between the periphery of the plane and the articulation of the first end of said arms, and on the other hand, connected by its second end to the respective arm in the vicinity of said holding surface;

control means connected to the actuation means for precisely relocating said plane, due to the arrangement of the articulations of the first ends of said arms and said actuation means on said plane, between a first folded position near the holding surface and a second unfolded position remote from the holding surface; and a device for synchronizing the relocation of the plurality of the actuation means, comprising means for monitoring and detecting the position occupied by said plane with respect to the horizontal in the course of extension or retraction, said means being connected to the control means acting on the actuation means, said monitoring and detection means comprising at least two liquid levels which communicate together via a pipe, and which are disposed in the vicinity of the periphery of said plane, and sensors of which each is rigidly associated with a level, which sensors are adapted to deliver an electric signal to an electric control box connected to the control means when a predetermined difference in distance is produced between said levels and said sensors.

2. The structure of claim 1 wherein the outputs of the two sensors are connected to an electric logic gate delivering an output signal or electric control box.

3. An extendable and retractable structure with orientable plane, adapted to cooperate with a holding surface, comprising attachment means connected respectively to said plane and to said holding surface, comprising:

connecting means constituted by at least two rigid arms of constant length, independent of each other, each being articulated by a first end on said plane and cooperating with said holding surface by its second end by means of a translating connection, the articulations of the first ends of said arms on said plane being remote from one another;

at least two linerarly extendable and retractable actuation means, independent of one another, each actuation means being associated respectively with an arm and being, on the one hand, articulated on said plane by a first end disposed between the periphery of the plane and the articulation of the first end of said arms, and on the other hand, connected by its second end to the respective arm in the vicinity of said holding surface;

control means connected to the actuation means, for precisely relocating said plane, due to the arrangement of the articulations of the first ends of said arms and said actuation means on said plane, between a first folded position near the holding surface and a second unfolded position remote from the holding surface; and a device for synchronizing the displacement of the plurality of the actuation means, comprising means for monitoring and detecting the position occupied by said plane with respect to the horizontal in the course of extension or retraction, said means being connected to the control means acting on the actuation means, said monitoring and detection means comprising two assemblies, each of which having at least two levels, a sensor being associated with each level, one of the assemblies acting during extension of the actuation means, the other of the assemblies acting during retraction of the actuating means.

* * * * *